United States Patent
Gebauer

(10) Patent No.: US 11,781,659 B2
(45) Date of Patent: Oct. 10, 2023

(54) METHODS AND SYSTEMS FOR DUAL FORCE VALVE ACTUATION

(71) Applicant: Cytiva Sweden AB, Uppsala (SE)

(72) Inventor: Klaus Gebauer, Uppsala (SE)

(73) Assignee: CYTIVA SWEDEN AB, Uppsala (SE)

( * ) Notice: Subject to any disclaimer, the term of this patent is extended or adjusted under 35 U.S.C. 154(b) by 0 days.

(21) Appl. No.: 16/981,114

(22) PCT Filed: Mar. 21, 2019

(86) PCT No.: PCT/EP2019/057073
§ 371 (c)(1),
(2) Date: Sep. 15, 2020

(87) PCT Pub. No.: WO2019/185442
PCT Pub. Date: Oct. 3, 2019

(65) Prior Publication Data
US 2021/0062923 A1 Mar. 4, 2021

(30) Foreign Application Priority Data

Mar. 26, 2018 (GB) .................................... 1804785
Apr. 4, 2018 (GB) .................................... 1805511

(51) Int. Cl.
*F16K 7/04* (2006.01)
*F16K 7/12* (2006.01)
(Continued)

(52) U.S. Cl.
CPC .................. *F16K 7/04* (2013.01); *F16K 7/12* (2013.01); *F16K 31/12* (2013.01); *F16K 31/122* (2013.01); *F16K 31/126* (2013.01)

(58) Field of Classification Search
CPC .......... F16K 7/04; F16K 31/12; F16K 31/122; F16K 31/126
See application file for complete search history.

(56) References Cited

U.S. PATENT DOCUMENTS

| 2,588,212 A | * | 3/1952 | Custer | F16K 7/06 |
| | | | | 251/5 |
| 2,735,642 A | * | 2/1956 | Norman | G05D 7/012 |
| | | | | 251/5 |

(Continued)

FOREIGN PATENT DOCUMENTS

| CN | 106415099 A | 2/2017 |
| JP | S5274918 A | 6/1977 |

(Continued)

OTHER PUBLICATIONS

PCT International Search Report and Written Opinion for PCT Application No. PCT/EP2019/057073 dated Jun. 16, 2019 (8 pages).

(Continued)

*Primary Examiner* — Umashankar Venkatesan
(74) *Attorney, Agent, or Firm* — Eversheds Sutherland (US) LLP

(57) ABSTRACT

A method for controlling at least one valve provided to a tube in a bioprocess flow system, said method comprising the steps of: —controlling the at least one valve to be in a first state, which is an open state when a flow through the tube should be allowed; —controlling the at least one valve to be in a second state during some parts of a process run in the system, said second state is a closed state were a first closing force is provided; and—controlling the at least one valve to be in a third state during some parts of a process run in the system, said third state is a closed state were a second closing force is provided which is a higher force than the first closing force.

24 Claims, 6 Drawing Sheets

(51) Int. Cl.
*F16K 31/12* (2006.01)
*F16K 31/122* (2006.01)
*F16K 31/126* (2006.01)

(56) References Cited

U.S. PATENT DOCUMENTS

| | | | | |
|---|---|---|---|---|
| 3,285,563 | A * | 11/1966 | Clarkson | F16K 7/061 251/8 |
| 3,642,026 | A * | 2/1972 | Sielaff | F16K 7/12 137/859 |
| 3,719,343 | A * | 3/1973 | Werra | F16K 7/126 251/61.1 |
| 4,375,882 | A * | 3/1983 | Schreiber, Jr. | F16K 7/12 251/266 |
| 4,471,938 | A * | 9/1984 | Schwarz | F16K 31/122 251/25 |
| 4,518,145 | A * | 5/1985 | Keltz | F16K 7/06 251/5 |
| 9,695,950 | B2 * | 7/2017 | Weitemeier | F16K 7/06 |
| 2001/0019117 | A1 | 9/2001 | Schoeb | |
| 2010/0138051 | A1 * | 6/2010 | Glime | F15B 11/036 700/282 |
| 2014/0299798 | A1 | 10/2014 | Opfer et al. | |
| 2014/0299801 | A1 * | 10/2014 | Aired | F16K 31/122 251/62 |
| 2015/0330516 | A1 * | 11/2015 | Spink | F16K 7/061 251/8 |

FOREIGN PATENT DOCUMENTS

| | | |
|---|---|---|
| JP | 10480972 U | 7/1992 |
| JP | 2005207470 A | 8/2005 |
| JP | 2009501878 A | 1/2009 |
| WO | 02/65007 A1 | 8/2002 |
| WO | 2017059370 A | 4/2017 |
| WO | 2017/134654 A1 | 8/2017 |

OTHER PUBLICATIONS

Great Britain Combined Search and Examination for GB Application No. 1804785.2 dated Sep. 28, 2018 (8 pages).
Simon, 'Pinch valve, chance of cold welding silicone tube', Physics Forums [online], 2014, available from: https://www.physicsforums.com/threads/pinch-valve-chance-of-cold-welding-silicone-tube.746344/.
Chinese Search Report for CN Application No. 201980022203.1 dated Mar. 15, 2022 (15 pages).
Japanese Office Action for JP Application No. 2020-551802 dated Apr. 24, 2023 (8 pages, with English translation).

* cited by examiner

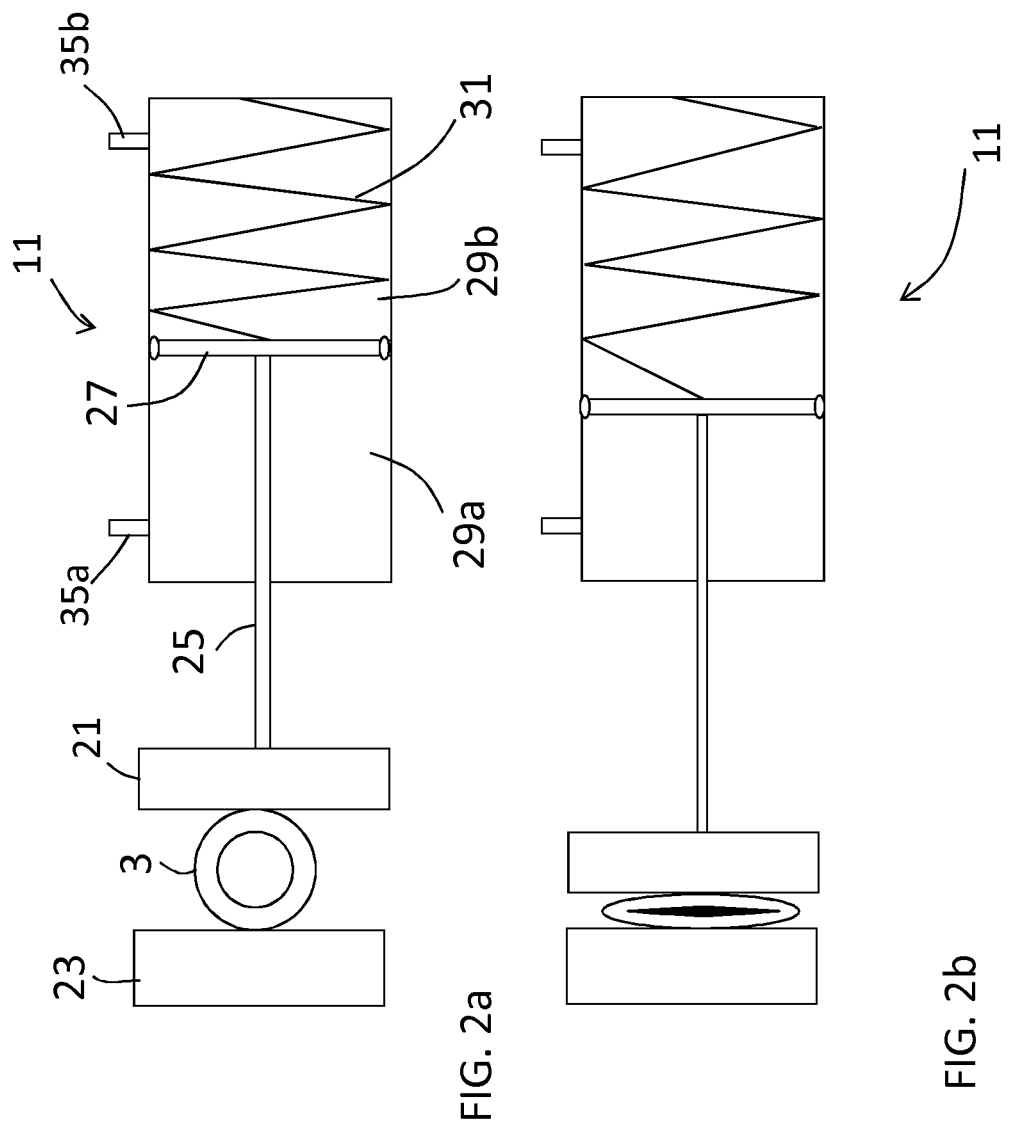

METHODS AND SYSTEMS FOR DUAL FORCE VALVE ACTUATION

CROSS REFERENCE TO RELATED APPLICATIONS

This application claims the priority benefit of PCT/EP2019/057073 filed on Mar. 21, 2019, which claims priority to Great Britain Application Nos. 1804785.2 and 1805511.1 filed on Mar. 26, 2018 and Apr. 4, 2018, respectively, the entire contents of which are hereby incorporated by reference herein.

TECHNICAL FIELD OF THE INVENTION

The present invention relates to a bioprocess flow system and to a valve and to a method for controlling at least one valve in a bioprocess flow system.

RELATED ART

In flow systems, for example systems for fluid transfer or fluid processing in the bioprocess industry, flexible tubes are often used for the transport of a fluid in the system. The bioprocess industry comprises processing of biopharmaceuticals, vaccines, gene therapy vectors, cells and other biomacromolecules/biological particles, including unit operations such as cell culture, filtration and/or chromatography. Flexible tube systems, together with other plastic components such as bags and fluid treatment devices, do provide cost-efficient solutions, i.e. when the flow systems are deployed pre-sterilized and used for single use applications, where the flow system is disposed after use.

For controlling the flow of fluid in said flexible tubes, valves are used. A common valve type is a pinch valve, where the flexible tube is pinched by the valve and a clamp, respectively for stopping the flow through the tube. By opening the valve and thereby releasing the pinching and clamping force, the tube opens reversibly and allows flow through the tube and its inner lumen. The opening of the tube is achieved by the elastic properties of the tube and its desire to assume its original shape of an open tube and lumen. Pinch valves are very cost efficient as they do not require additional valve parts beyond the tube itself to be in fluid contact compared to diaphragm valves or other valve principles applied for flow systems. However, there may be problems when opening pinch valves, in especially if the valves have been closed for a long time and with a high closing (clamping) force. This as the opposite sides of the tubes inner surfaces in the lumen of the tube may tend to stick together at the position of the pinching and the tube may therefore remain closed, even after the valve has been opened and the tube is no longer exposed to the external clamping. This may depend on the material of the tubes and/or the type of fluid in contact with the inner surface of the tube, prior or during the pinching event. Obviously, the material of the inner tube walls clamped together when pinching the tube is similar and identical by the nature of the tube. Thus, it can be speculated, that under certain conditions a certain material homogenization effect is the cause of the inner walls sticking together.

If the tube is not opening when the valve, and its actuator or clamp subjecting the tube to the pinching force is opened, the result will be a blocking of flow in the tubing and a disturbance or stopping of the underlying fluid process. When this situation occurs, manual squeezing and massaging of the tube can sometimes solve the problem but this is of course a problem, especially in an automated system.

In U.S. Pat. No. 9,695,950 one type of pinch valve trying to solve this problem is described. Here the pinch valve comprises a clamping jaw which can pinch the tube both vertically and horizontally in order to help the tube to open after having been closed.

Similar problems may occur in a single use and disposable flow system using plastic diaphragm valves instead of pinch valves. Diaphragm valves are designed as a valve body with a rigid valve seat and a flexible diaphragm that is moved against the valve seat to stop the fluid flow. Diaphragm valves may suffer from the same issue of the sealing surfaces sticking to each other, hereby preventing a smooth and controlled opening of the valve and disturbing or stopping the process. In contrast to pinch valves, where the materials of the two surfaces and components sealing against each other are identical, however, the diaphragm and the valve seat at diaphragm valves are different in material type or at least material properties, for example elasticity.

SUMMARY

An object of the present invention is to provide an improved flow system and an improved method for controlling at least one valve in a flow system.

A further object of the invention is to provide a flow system and a method in a flow system where flow in the system can be controlled reliably.

Still a further object of the invention is to provide a flow system and a method for controlling at least one valve in a flow system providing less risk that surfaces in the flow path at the location of the valve stick to each other and prevents flow even after the valve has been opened.

This is achieved by a method, by a bioprocess flow system and by a valve according to the independent claims.

According to one aspect of the invention a method for controlling at least one valve provided to a tube in a bioprocess flow system is provided. Said method comprises the steps of:
 controlling the at least one valve to be in a first state, which is an open state when a flow through the tube should be allowed;
 controlling the at least one valve to be in a second state during some parts of a process run in the system, said second state is a closed state were a first closing force is provided; and
 controlling the at least one valve to be in a third state during some parts of a process run in the system, said third state is a closed state were a second closing force is provided which is a higher force than the first closing force.

According to another aspect of the invention a bioprocess flow system is provided comprising:
 at least one tube;
 at least one valve provided to said tube for controlling the flow through said tube; and
 a control system configured for controlling said at least one valve to be in three different states whereof a first state is an open state where the tube is kept open for allowing flow through the tube and a second and a third state are closed states preventing flow through the tube but with different closing force provided, whereby a higher closing force is provided in the third state than in the second state.

According to another aspect of the invention a valve is provided. Said valve is configured for being provided in three different states, whereof
- a first state is an open state where a tube provided with said valve is kept open for allowing flow through the tube;
- a second and a third state are closed states but with different closing forces, whereby a tube provided with said valve is closed for flow in both these closed states but with a higher closing force in the third state than in the second state.

Hereby, by avoiding a higher closing force than necessary, for example when a fluid is not pumped through the tube where the valve is provided, a flow system and a method for controlling at least one valve in a flow system is provided where there is less risk that surfaces in the flow path at the location of the valve stick to each other and thereby prevent flow even after a valve has been opened. In the case of a pinch valve the surfaces sticking together are opposite inner sides of the flexible tube which is pinched by the pinch valve and in the case of a membrane valve the surfaces are a valve seat and the membrane of the membrane valve. A higher closing force can be used when the system is in operation, i.e. when fluid is pumped through the tube where the valve is provided, or for certain applications and a lower closing force can be used for example when the system is idle, for example overnight. This is an easy solution to the problem of surfaces sticking together at the position of a valve which solution can be implemented by use of ordinary valves with small modifications and by controlling them in a new way. The fluid is suitably a liquid, such as an aqueous liquid. It can in particular be an aqueous buffer or an aqueous solution of a biomolecule, such as a protein.

In one embodiment of the invention the steps of controlling the at least one valve to be in the second state and the third state comprise urging a flexible material into sealing contact with a surface.

In one embodiment of the invention said method is a method for ensuring reliable opening of at least one valve.

In one embodiment of the invention said at least one valve is a pinch valve and the step of controlling the at least one valve to be in a second state comprises pinching the tube with the first closing force, which first closing force is adapted to stop the flow in the tube at a first fluid pressure in the tube; and wherein the step of controlling the at least one valve to be in a third state comprises pinching the tube with the second closing force, which second closing force is adapted to stop the flow in the tube at a second fluid pressure in the tube which is higher than the first fluid pressure in the tube.

In one embodiment of the invention said at least one valve is a membrane valve and the step of controlling the at least one valve to be in a second state comprises moving a membrane of the valve towards a valve seat of the valve with the first closing force, which first closing force is adapted to stop the flow in the tube at a first fluid pressure in the tube; and wherein the step of controlling the at least one valve to be in a third state comprises moving a membrane of the valve towards a valve seat of the valve with the second closing force, which second closing force is adapted to stop the flow in the tube at a second fluid pressure in the tube which is higher than the first fluid pressure in the tube.

In one embodiment of the invention said at least one valve is controlled to be in the second state when no fluid is pumped through the tube and said valve is controlled to be in the third state when fluid is pumped through the tube.

In one embodiment of the invention said at least one valve is controlled to be in either the second or the third state for closing the valve in dependence of which type of tubes that are used in the system and/or in dependence of which application the system is used for.

In some embodiments of the invention a first closing force is provided from the at least one valve in the second state and a second closing force is provided from the at least one valve in the third state, wherein said first closing force is set to prevent fluid flow at a fluid pressure being less than 50% of the fluid pressure the second closing force is set to prevent or wherein said first closing force is set to prevent fluid flow at a fluid pressure being less than 30% of the fluid pressure the second closing force is set to prevent or wherein said first closing force is set to prevent fluid flow at a fluid pressure being less than 20% of the fluid pressure the second closing force is set to prevent or wherein said first closing force is set to prevent fluid flow at a fluid pressure being less than 10% of the fluid pressure the second closing force is set to prevent.

In some embodiments of the invention a first closing force is provided from the at least one valve in the second state and a second closing force is provided from the at least one valve in the third state, wherein said second closing force is set to prevent fluid flow at a pressure of up to 20 bar or up to 10 bar or up to 5 bar.

In one embodiment of the invention said at least one valve is controlled by pneumatic air or hydraulic fluid.

In one embodiment of the invention said bioprocess flow system is a chromatography system, a filtering system or a bioreactor system.

Further embodiments are described in the detailed description and in the dependent claims.

BRIEF DESCRIPTION OF THE DRAWINGS

FIGS. 2a and 2b are schematic drawings of a normally closed pinch valve which can be provided in three different states according to one embodiment of the invention.

DETAILED DESCRIPTION OF EMBODIMENTS

Figure 1:
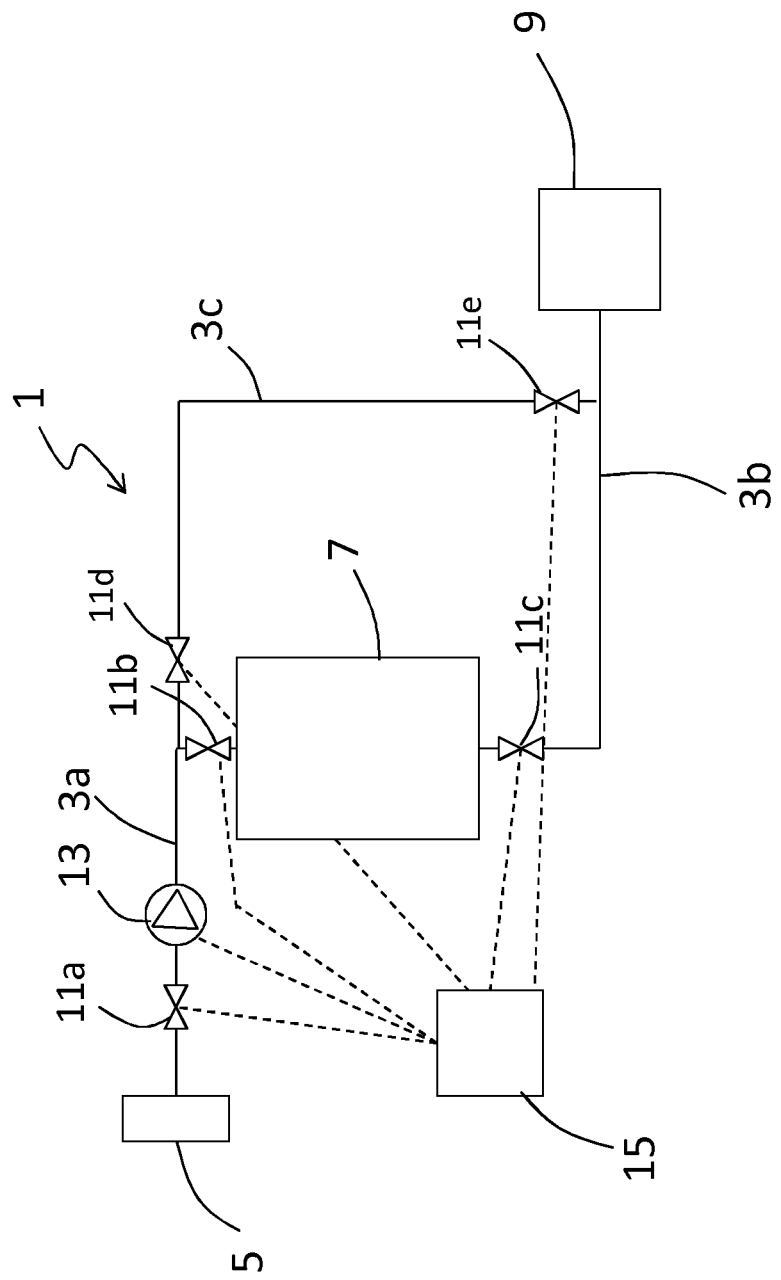
FIG. 1 is a schematic drawing of a flow system according to one embodiment of the invention.

According to the invention a flow system is provided which flow system comprises at least one tube and at least one valve provided to said tube for controlling the flow through said tube. The at least one valve is provided downstream from a flow providing device provided in said flow system or in a connected flow system. The flow providing device could be for example at least one pump or a pressure vessel. The flow system comprises further a control system configured for controlling said at least one valve to be in three different states. A first state of the valve is an open state where the tube is kept open for allowing flow through the tube and a second and a third state of the valve are closed states preventing flow through the tube but with different closing force provided from the valve. A higher closing force is provided in the third state than in the second state.

Said method is a method for ensuring reliable opening of at least one valve. Furthermore, the steps of controlling the at least one valve to be in the second state and the third state comprise urging a flexible material into sealing contact with a surface.

The valve can be for example a pinch valve and said control system is then configured for controlling said at least one pinch valve to be in the second state by pinching the tube with a first closing force, which first closing force is adapted to stop the flow in the tube at a first fluid pressure in the tube. Furthermore, said control system is configured for controlling said at least one pinch vale to be in a third state by pinching the tube with a second closing force, which second closing force is adapted to stop the flow in the tube at a second fluid pressure in the tube which is higher than the first fluid pressure in the tube. Pinch valves according to two different embodiments of the invention are described in relation to FIGS. 2 and 3.

The valve can in another example be a membrane valve and said control system is configured for controlling said at least one membrane valve to be in the second state by moving a membrane of the membrane valve towards a valve seat of the membrane valve with a first closing force, which first closing force is adapted to stop the flow in the tube at a first fluid pressure in the tube. Furthermore said control system is configured for controlling said at least one membrane valve to be in a third state by moving a membrane of the membrane valve towards a valve seat of the membrane valve with a second closing force, which second closing force is adapted to stop the flow in the tube at a second fluid pressure in the tube which is higher than the first fluid pressure in the tube. A membrane valve according to one embodiment of the invention is described in relation to FIG. 4.

The flow system according to the invention can be a system for fluid transfer or fluid processing in the bioprocess industry. The flow system can be for example a bioprocess system such as for example a chromatography system, a filtration system or a bioreactor system.

FIG. 1 is a schematic drawing of a flow system 1 according to one embodiment of the invention. The flow system 1 comprises a first tube 3*a*, a second tube 3*b* and a third tube 3*c* for transporting fluid in the system. The tubes 3*a*, 3*b*, 3*c* can be flexible tubes. The flow system according to this example comprises a first tank 5 which is connected by the first tube 3*a* to a fluid treatment device 7. Said fluid treatment device 7 is in turn connected to a second tank 9 by the second tube 3*b*. The third tube 3*c* is a bypass tube for bypassing the fluid treatment device 7. The fluid treatment device 7 can for example be a chromatography column, a filtration device or a bioreactor. The flow system 1 comprises further a number of valves for controlling the flow through the tubes. The first tube 3*a* comprises a first valve 11*a* and a second valve 11*b* and a pump 13 in between said two valves 11*a*, 11*b*. The second tube 3*b* comprises a third valve 11*c* and the third tube 3*c* comprises a fourth valve 11*d* and a fifth valve 11*e*. The flow system 1 comprises furthermore a control system 15 configured for controlling at least one of said valves 11*a*, 11*b*, 11*c*, 11*d*, 11*e* to be in three different states depending on different situations in the flow system. A first state is an open state where the tube to which said valve is provided is kept open for allowing flow through the tube. A second and a third state are closed states preventing flow through the tube to which said valve is provided. Different closing forces are provided from the valve for the second and the third state, whereby a higher closing force is provided in the third state than in the second state. A first closing force is provided from the valve in the second state and said first closing force is adapted to stop the flow in the tube where said valve is provided at a first fluid pressure in the tube. A second closing force is provided from the valve in the third state and said second closing force is adapted to stop the flow in the tube where the valve is provided at a second fluid pressure in the tube which is higher than the first fluid pressure in the tube. As discussed above the valves can for example be pinch valves or membrane valves. This will also be further discussed below in relation to FIGS. 2-4.

By providing two different closing states of the valve where different closing forces are provided the system can be adapted for different situations, for example different types of tubes, different applications and different sequences or operating conditions of the processes run. For example the second state, with a lower closing force can be used when no fluid is pumped through the tube where the valve is provided and the third state with a higher closing force can be used when fluid is pumped through the tube where the valve is provided. With the second state, for example, a lower closing force can be used when the valve shall stop the fluid flow under conditions of lower fluid pressure, for example when the pump is stopped and syphoning of fluid within the flow system shall be prevented due to hydrostatic pressure differences. With the second state, a lower closing force may also be used to provide stopping of the flow through the valve at a fluid pressure that is low compared to a higher fluid pressure in the flow system. To stop the flow under conditions of higher fluid pressure the valve is provided in the third state where a higher closing force is provided. The second state can for example be used when the system or a part of the system where the valve is provided is not in operation but filled with fluid, when waiting for other parts or operations in the system, separation process or workflow to be completed or if the system is paused during night. The third state can be used when the system or part of the system where the valve is provided is in operation. By using the second state during the times when the system is not in operation, fluid flow across the valve is still stopped and any unwanted transfer of fluid is prohibited, for example by syphoning. Hereby valves provided in different parts of the system can be set in different closing states in dependence of these parts of the system being under high pressure (i.e. if fluid is pumped) or not.

In one embodiment of the invention the closing state for all valves, or at least a number of valves, in a flow system according to the invention are altered in dependence of the system (and the pump for example) being in operation or in idle state. This embodiment of the invention allows controlling and altering of a supply pressure upstream a hydraulic valve control and enables a simple and cost-efficient implementation of the invention, which also may be applied to legacy systems.

Hereby the problem with surfaces sticking to each other and thus preventing opening of a valve can be decreased as the risk of sticking surfaces in the valve is related to the closing force as well as the duration of applying the closing force. In the example of a pinch valve the inner surfaces of the tube which are pinched towards each other when the pinch valve is closed may stick to each other and prevent fluid flow even when the pinch valve later is opened. This problem with tube surfaces sticking to each other will be bigger if a higher force is used for the pinching and if the valve is closed for a long time. The same is true for a membrane valve where a valve seat will stick to the membrane. A higher force and a longer closing time of the valve will increase the risk that the surfaces stick to each other. Hereby, by the use of this invention where the closing force can be adapted to different situations there will be a lower risk that the fluid flow is prevented due to surfaces sticking to each other even after a valve has been opened. Especially during long closing times when no fluid is pumped through the tube where the valve is provided a lower closing force can be used according to the invention.

Levels of the first and second closing forces can be preset in dependence of for example a max operating fluid pressure for the flow system. The first closing force can be set to prevent flow at a fluid pressure being a certain percentage of the maximum operating fluid pressure, or the first closing force can be set to prevent fluid flow at a pre-defined fluid pressure, for example a fluid pressure lower than the maximum operating fluid pressure but higher than the hydrostatic pressure that would be the result of differences in fluid inlet and outlet elevation and elevation of connected fluid vessels. If the flow system and the valve is connected to a fluid source, for example a pressurized vessel or fluid supply system, having a pre-defined fluid pressure or fluid pressure range lower than the typical operating pressure of the flow system during operation, then the first closing force may be set to prevent the fluid flow in the flow system at said pressure of the fluid source. The specific levels of the first and second closing forces can be determined by challenging the valve and tubing with aqueous liquid at different pressures and determining when leakage occurs.

In one embodiment of the invention said first closing force is set to prevent fluid flow at a fluid pressure being less than half the fluid pressure the second closing force is set to prevent.

In one example the first closing force can be set to prevent fluid flow at a fluid pressure of up to 0.5 bar and a second closing force can be set to prevent fluid flow at a fluid pressure of up to 5 bar. In another example the second closing force can be set to prevent fluid flow at a fluid pressure of up to 10 bar.

In another embodiment of the invention said first closing force is less than half the force of the second closing force.

By measuring the fluid pressure in a system when the system is not in operation, i.e. the pumps are not pumping, and when the system is in operation the valves can be set to have a suitable first and second closing force.

The flow system can in one embodiment of the invention measure a present fluid pressure at certain positions in the system and in dependence of these measurements control the vales to be in either the second or the third closed states. A certain time delay can be used for the change of valve states, for example to allow for relaxation of fluid pressure before changing the valve state, for safety reasons or to avoid frequent changing valve states in between subsequent operations comprising only short periods of idle states.

In FIGS. 2a and 2b a normally closed pinch valve 11 which can be provided in three different states according to one embodiment of the invention is schematically shown. In FIG. 2a a first state which is an open state is shown. In FIG. 2b a second or a third state, which both are closed states, is shown. This pinch valve 11 comprises a tube pinching part 21 which is arranged to be provided in connection with the tube 3 such that it can pinch the tube 3 against a stationary part 23. This stationary part could be a part of the pinch valve 11 itself or a separate part provided in the system. The tube pinching part 21 is connected through a rod 25 to a piston 27 which is provided within a chamber 29. The chamber 29 can be a cylinder. The chamber 29 is divided into two parts by the piston 27, a first chamber part 29a and a second chamber part 29b. A first fluid inlet 35a is provided to the first chamber part 29a and a second fluid inlet 35b may be provided to the second chamber part 29b. The piston 27 is subjected to force from a spring 31 acting on both piston 27 and a rear wall 33 of the second chamber part 29b. Hereby the tube pinching part 21 is moved towards the tube and is closing the tube to achieve a normally closed stated of the valve. Depending on the spring type selected and the spring force applied, and in combination with fluid pressures applied to the first and second chamber parts 29a and 29b, through the first and second fluid inlets 35a and 35b, a resulting closing force can be selected which will provide the valve in one of its closed states (second state or third state).

A fluid, such as a gas or a liquid is provided in the first chamber part 29a and a fluid pressure inside the first chamber part 29a can be changed by introducing more fluid through the first inlet 35a. Hereby the piston 27 will move towards the rear wall 33 of the second chamber part 29b and hereby also the tube pinching part 21 will move away from the stationary part 23. In FIG. 2a more fluid has been provided into the first chamber part 29a hereby compressing the spring 31 and moving the tube pinching part 21 away from the stationary part 23, i.e. opening the pinch valve such that fluid flow is allowed through the tube 3. This is according to the invention called a first state, which is an open state.

In FIG. 2b the fluid pressure in the first chamber part 29a is less than in FIG. 2a. Hereby the spring 31 is released and the tube pinching part 21 is moved towards the stationary part 23 and hereby the tube 3 is pinched between the tube pinching part 21 and the stationary part 23. According to the invention this is called a second or a third state and it is a closed state where flow is not allowed through the tube 3. According to the invention there are two different closed states with different closing forces provided by the valve, the second state and the third state. In this embodiment of the invention these different closing forces can be achieved either by controlling the providing of a fluid into the first chamber part 29a in at least two different levels. In another embodiment a second inlet 35b is provided to the second chamber part 29b and a fluid pressure can be changed also in the second chamber part 29b. Hereby three different states according to the invention can be provided. One state can suitably be provided without any extra fluid pressure provided to the chamber 29. In the embodiment shown in FIGS. 2a and 2b this is a closed state. Hereby the pinch valve is a normally closed pinch valve. Another closed state is provided by forcing additional fluid and hereby increase fluid pressure in either the first chamber part 29a or the second chamber part 29b. In the case where fluid pressure is increased in the first chamber part 29a for providing another closed state this other closed state is the second state as referred to above and in the case where fluid pressure is increased in the second chamber part 29b for providing another closed state this other closed state is the third state as referred to above.

In a first embodiment, a normally closed pinch valve according to FIGS. 2a and 2b is provided, where the third state and the second closing force is applied by a spring, for example spring 31 in second chamber part 29b. Hereby, the valve will stop the fluid flow in the tube at high operating pressure and in a normally closed default state, even if no hydraulic fluid pressure is applied to one or two of the first and second chamber parts 29a or 29b. This design provides safety against potential failures or interruptions in the supply of hydraulic fluid. During operation of the valve and a flow system, the valve is opened and fluid flow through the valve is enabled by applying a hydraulic fluid pressure to the first chamber part 29a such that the valve is brought into its first, open, state. In order to provide the second state with its first closing force and to reduce the clamping force on the tubing in the flow system, a hydraulic fluid pressure is applied to the first chamber part 29a that is lower than the hydraulic fluid pressure applied to the first chamber part 29a for the first, open, state. Hereby, the clamping force on the tubing is reduced compared to the third state.

In a second embodiment, the valve according to the first embodiment is controlled to its first and second state by applying different hydraulic fluid pressure to the first chamber part 29a, while the second chamber part 29b is vented to atmosphere. The at least two hydraulic fluid pressure levels applied to the first chamber part 29a are controlled either by one pressure regulator that can be controlled automatically by the system. In another embodiment, the first chamber part 29a is connected to two different regulators which are set to two different pre-defined hydraulic fluid pressures. When using two regulators, one regulator is provided with a pre-defined hydraulic fluid pressure defining the second state, while another regulator is provided with a pre-defined hydraulic fluid pressure defining the first state corresponding to an open valve. A switch valve is used to select and determine which of the two hydraulic fluid pressures is applied in order to provide the valve in the first or second state. The switch valve may be operated manually, however, an automatic operation by the control system is preferable.

In a third embodiment, the at least two valves of the second embodiment are controlled to their first and their second state by bringing them, individually or simultaneously and thereby in parallel connection, into hydraulic fluid connection with the respective regulator(s) defining the first and second state.

If the flow system is provided with different tubing, for example having different size, lumen diameter, material, wall thickness, or if the flow system is provided with regimes that are operated with different fluid pressure in the flow system, the valve according to the invention may be controlled to more than two closing states stopping the fluid flow in the flow system. Further, different valves controlled to at least two closing states, are provided, the valve for example differing in valve geometry and dimensions, spring load, size of hydraulic chambers etc. may be applied, clamping dimensions.

Figure 3A:
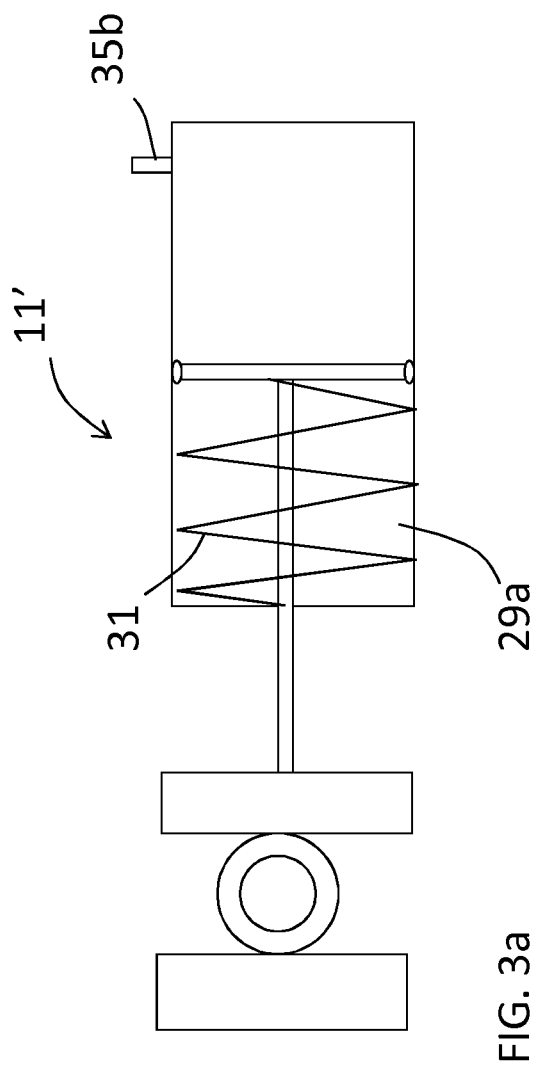
FIGS. 3a and 3b are schematic drawings of a normally open pinch valve which can be provided in three different states according to one embodiment of the invention.
Figure 3B:
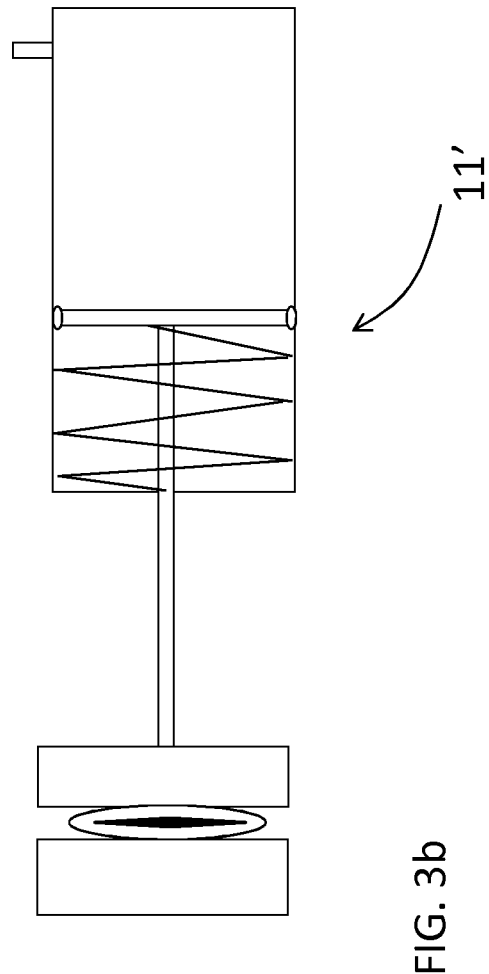

FIGS. 3a and 3b are schematic drawings of a normally open pinch valve 11' which can be provided in three different states according to one embodiment of the invention. The only difference from the embodiment described in relation to FIGS. 2a and 2b is that the spring 31 is provided in the first chamber part 29a instead of in the second chamber part 29b, hereby opening the valve by spring force when no fluid pressure is supplied to chamber 29b. In this embodiment the valve is open and flow is allowed through the tube 3 when no extra fluid pressure is provided to the chamber 29. For providing two different closed states additional fluid is provided in two different amounts into the second chamber part 29b through the second inlet 35b for providing two different levels of fluid pressure.

In other embodiments, the spring and the spring force shown in above examples may be omitted and the pinch valve is operated and controlled to the said three states by pneumatic fluid pressure in the two valve chambers 29a and 29b.

In another embodiment, the valve is controlled to its three states by application of different fluid pressures to one of the chambers only. For example, different fluid pressure may be applied to chamber 29b, where the open state of the valve is accommodated by either applying pressure below atmospheric pressure and thereby retracting the rod 25 and clamp 21, or by venting chamber 29b to atmospheric pressure such that the elasticity the tube itself, and its intrinsic desire to assume its original shape of an open tube and lumen, pushes clamp 21 and rod 25 toward chamber 29b.

In other embodiments, the spring functionality and spring force may be exerted by other design elements and properties, such for example mechanical, electrical or magnetic properties.

Figure 4A:
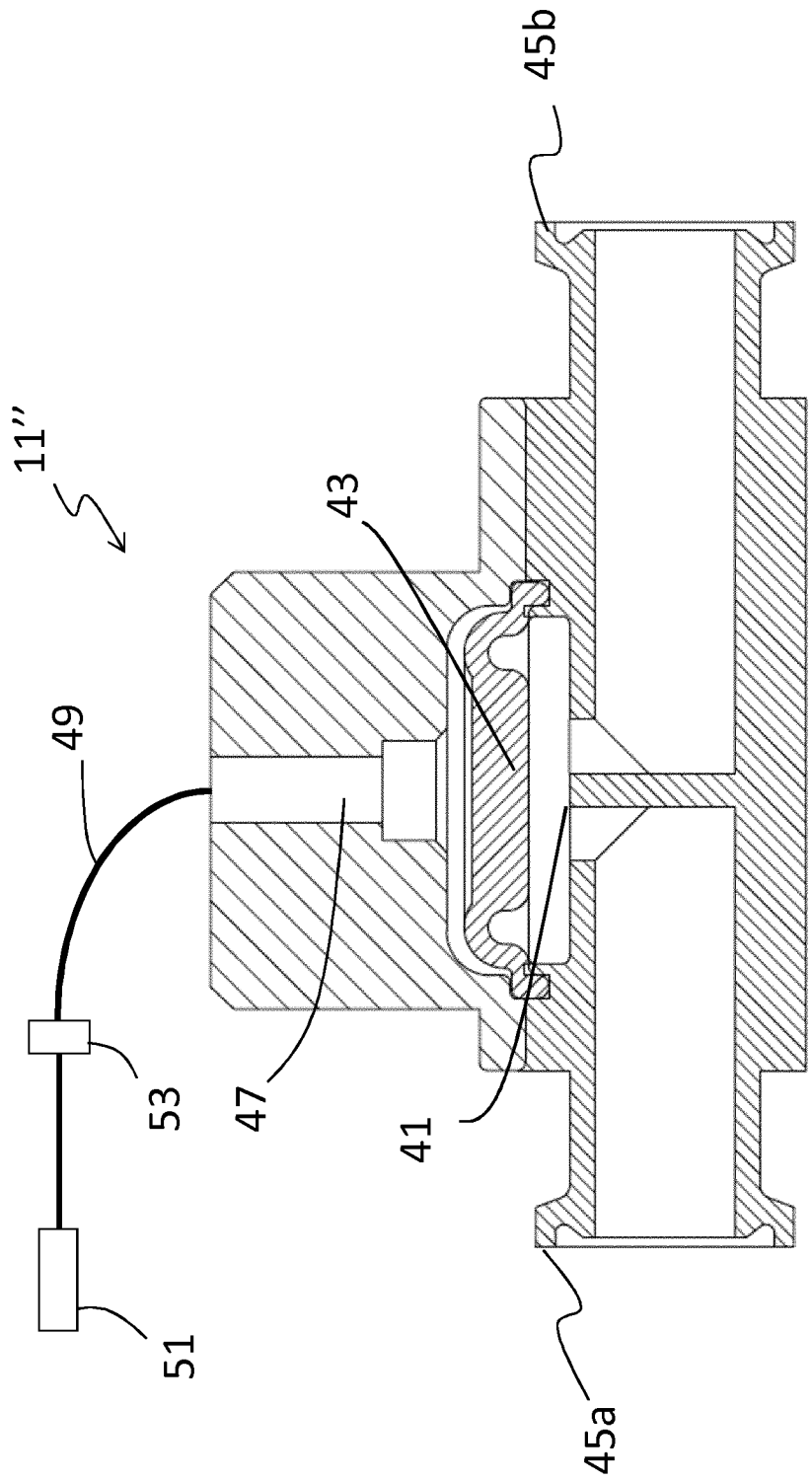
FIGS. 4a and 4b are schematic drawings of two membrane valves which can be provided in three different states according to one embodiment of the invention.

FIG. 4a is a schematic drawing of a membrane valve 11" which can be provided in three different states according to one embodiment of the invention. The membrane valve 11" is shown with connectors 45a, 45b that are connecting to adjacent fluid conduits, for example a tube that may be rigid or flexible. In another embodiment, the valve is integrated into the adjacent fluid conduits upstream and downstream the valve such that a connector and connecting interface is omitted. In another embodiment, the inlet and outlet of the valve may be integrally joined with the fluid conduits upstream and downstream by welding, for example.

The membrane valve comprises a valve seat 41 and a membrane 43. The process fluid is guided to pass over the valve seat 41. The membrane 43 can be controlled for example by hydraulics or pneumatics to contact the valve seat 41 in order to close the valve such that fluid flow is prevented through the membrane valve 11". According to the invention a first state which is an open state is provided and two closed states with different closing forces are provided. The different closing forces are provided by providing two different levels of fluid pressure acting on the membrane 43 herby moving the membrane 43 towards the valve seat 41 in at least two different levels. A hydraulic/pneumatic chamber 47 is provided in connection with the membrane 43 for the hydraulic/pneumatic control of the membrane 43. Remote control of the membrane valve 11" can be provided through a tube 49 connected to the hydraulic/pneumatic chamber 47. A connector 51, for example an aseptic connector, can be connected to the other end of the tube 49 for connection to a pneumatic/hydraulic control system (15 when referring to FIG. 1). The connector 51 can in one embodiment be a multi connector which is connecting a number of pneumatic/hydraulic tubes at the same time. In one embodiment of the membrane valve 11" a sterile filter 53 is furthermore provided in the tube 49 between the hydraulic/pneumatic chamber 47 and the connector 51. This sterile filter 53 will ensure that the pneumatic/hydraulic fluid in the pneumatic/hydraulic chamber 47 not is contaminated. In one embodiment the sterile filter is an air filter and the pneumatic/hydraulic fluid is air. Hereby, possible disadvantages by the use of non-sterile pneumatic/hydraulic fluid from a connected pneumatic/hydraulic control system 15 can be handled by the use of a sterile filter 53.

The membrane valve can be provided, alone or together with other valves and together with a disposable flow system and aseptic connectors, 45a, 45b, 51, as a pre-sterilized flow kit. This can be provided in a bag and be sterilized for example by gamma radiation.

In one embodiment of the invention, applicable both to a pinch valve and a membrane valve according to the invention, air, other gas or a gas mixture is used for control of the valves, which can furthermore be conditioned, treated or pre-treated, such as control of humidity, composition and aerosol content.

The air, other gas or gas mixture can be sterilized, for example together with the sterilization of the disposable flow path. Further, the air, other gas or gas mixture provided to the system and/or provided to the pneumatic/hydraulic control system for controlling the valves and/or the valves can be fed sterile filtered to the system, the control system or the valves.

Figure 4B:
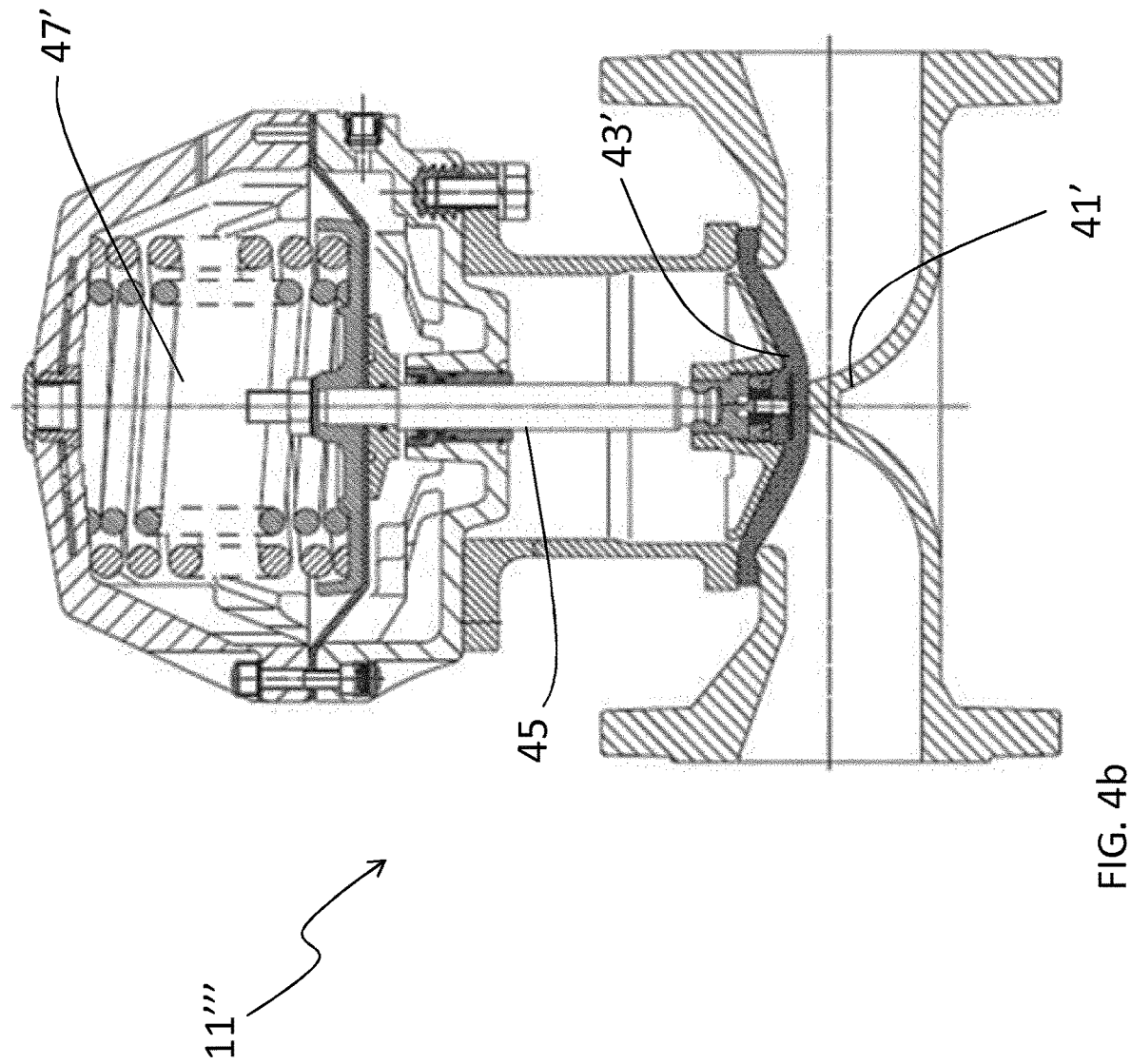

FIG. 4b shows another type of a membrane valve 11''' which can be provided in three different states according to the invention. In this type of membrane valve the membrane 43' is moved against the valve seat 41' by a rod 45. Two different closing forces can be provided by the rod for closing the valve according to the invention. The position of the rod 45 and hereby the membrane 43' can be controlled by pneumatic/hydraulic fluid. A pneumatic/hydraulic chamber 47' is provided in connection with the rod 45.

In one embodiment, the first (open) state of the membrane valve 11'', 11''' is controlled by application of a pressure lower than the atmospheric pressure to the pneumatic/hydraulic chamber 47, 47'.

In another embodiment, the first (open) state of the membrane valve is facilitated by venting the pneumatic/hydraulic chamber 47, 47' to atmospheric pressure, thus allowing the membrane 43, 43' to assume its natural and relaxed state according to its inherent elastic properties.

In other embodiments, the first state of the valve and the corresponding force and position of the membrane associated to the first state is facilitated by or with help of other design elements and properties, such as for example mechanical, electrical or magnetic properties.

According to the invention a control system is provided which is configured for controlling the at least one valve to be provided in the three different states. Said control system comprises means for processing and executing a computer program and means for wired or wireless communication for performing the control according to the invention.

Said control system controls a hydraulic or pneumatic control system for controlling the hydraulic/pneumatic fluid pressure controlling the valve states.

Figure 5:
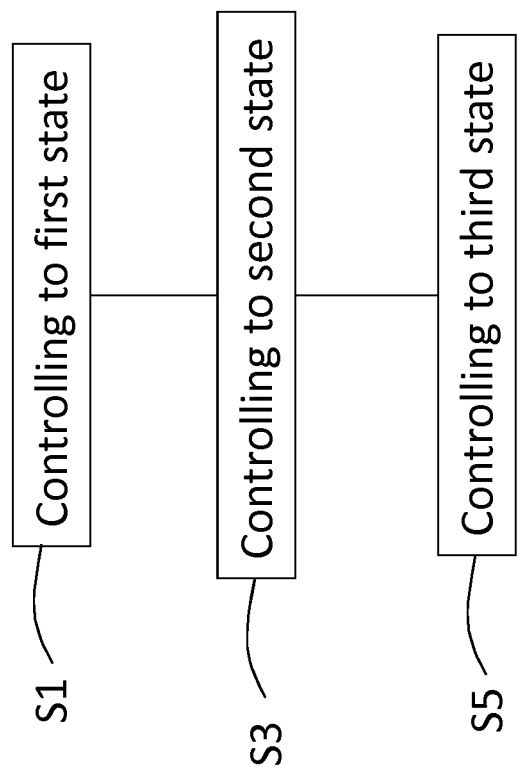
FIG. 5 is a flow chart of a method according to one embodiment of the invention.

Furthermore, according to the invention a method for controlling at least one valve provided to a tube in a flow system is provided. A flow chart of the method is shown in FIG. 5. The method steps are described in order below:

S1: Controlling the at least one valve to be in a first state, which is an open state when a flow through the tube should be allowed.

S3: Controlling the at least one valve to be in a second state during some parts of a process run in the system, said second state is a closed state were a first closing force is provided.

S5: Controlling the at least one valve to be in a third state during some parts of a process run in the system, said third state is a closed state were a second closing force is provided which is a higher force than the first closing force.

The tubes provided in the flow system may be flexible tubes. If pinch valves are used the tubes need to be flexible. The tubes can be braided for high pressure applications and non-braided for lower pressure applications. Such flexible tubes can for example be made from silicone, typically platinum cured silicone or a thermoplastic. These materials of common flexible tubes may tend to stick to itself, especially during certain conditions and with certain fluids flowing through the tubes and therefore the present invention will be especially useful for systems having these types of tubes such as tubing made from silicones, polyolefin and thermoplastic elastomers.

Examples of silicone tubing, preferably platinum cured silicone tubing, are Saniflex APSH (non-braided), Saniflex APST (braided). Examples of polyolefin tubing are Tygon tubings, such as Tygon 2275 IB in a non-braided version. Examples of thermoplastic elastomeric tubing are Advanta Flex, C-Flex, C-Flex 374 and SaniPure.

With silicone tubing, a risk for sticking tubes in pinch valves has for example been observed after contact and prolonged valve closure with solutions containing sodium hydroxide (NaOH) in the pinched tube, a substance frequently used for cleaning of flow systems (in typical concentrations of 0.5-2M). With thermoplastic tubing, a risk for sticking tubes in pinch valves has been observed after contact and prolonged valve closure with water or air in the pinched tube.

Tubes and valves of the flow system according to the invention may be provided in closed, pre-sterilized packages for mounting to the system. Hereby tubes together with the valves according to the invention can be pre-sterilized, possibly by gamma sterilization, and suitable for single use.

The invention claimed is:

1. A method for controlling at least one valve provided to a tube in a bioprocess flow system, said method comprising the steps of:
   controlling the at least one valve to be in a first state, which is an open state when a flow through the tube should be allowed;
   controlling the at least one valve to be in a second state during some parts of a process run in the system, said second state is a closed state where a first closing force is provided; and
   controlling the at least one valve to be in a third state during some parts of a process run in the system, said third state is a closed state where a second closing force is provided which is a higher force than the first closing force
   wherein the steps of controlling the at least one valve to be in the second state and the third state comprise urging a pinching portion of the tube into sealing contact.

2. The method according to claim 1, wherein said method is a method for ensuring reliable opening of at least one valve.

3. The method according to claim 1, wherein the step of controlling the at least one valve to be in a second state comprises pinching the tube with the first closing force, which first closing force is adapted to stop the flow in the tube at a first fluid pressure in the tube; and wherein the step of controlling the at least one valve to be in a third state comprises pinching the tube with the second closing force, which second closing force is adapted to stop the flow in the tube at a second fluid pressure in the tube which is higher than the first fluid pressure in the tube.

4. The method according to claim 1, wherein said at least one valve is controlled to be in the second state when no fluid is pumped through the tube and said valve is controlled to be in the third state when fluid is pumped through the tube.

5. The method according to claim 1, wherein said at least one valve is controlled to be in either the second or the third state for closing the valve in dependence of which type of tubes that are used in the system and/or in dependence of which application the system is used for.

6. The method according to claim 1, wherein a first closing force is provided from the at least one valve in the second state and a second closing force is provided from the at least one valve in the third state, wherein said first closing force is set to prevent fluid flow at a fluid pressure being less than 50% of the fluid pressure the second closing force is set to prevent.

7. The method according to claim 1, wherein a first closing force is provided from the at least one valve in the second state and a second closing force is provided from the at least one valve in the third state, wherein said second closing force is set to prevent fluid flow at a pressure of up to 20 bar.

8. The method according to claim 1, wherein said at least one valve is controlled by pneumatic air or hydraulic fluid.

9. The method according to claim 1, wherein said bioprocess flow system is a chromatography system, a filtering system or a bioreactor system.

10. A bioprocess flow system comprising:
at least one tube;
at least one valve provided to said tube for controlling the flow through said tube; and
a control system configured for controlling said at least one valve to be in three different states whereof a first state is an open state where the tube is kept open for allowing flow through the tube and a second and a third state are closed states preventing flow through the tube during some parts of a process run in the system but with different closing force provided, whereby a higher closing force is provided in the third state than in the second state; and
wherein the control system is configured for controlling the state of the at least one valve to be in the third state when the tube should be closed when the system or part of the system where the valve is provided is in operation, and for controlling the state of the at least one valve to be in the second state when the tube should be closed when the system or a part of the system where the valve is provided is not in operation, when waiting for other parts or operations in the system, separation process or workflow to be completed or if the system is paused.

11. The bioprocess flow system according to claim 10, wherein the control system is configured for controlling said at least one valve to be in the second state and the third state by urging a pinching portion of the tube into sealing contact.

12. The bioprocess flow system according to claim 10, wherein said at least one valve is a pinch valve and said control system is configured for controlling said at least one pinch valve to be in the second state by pinching the tube with a first closing force, which first closing force is adapted to stop the flow in the tube at a first fluid pressure in the tube; and wherein said control system is configured for controlling said at least one pinch valve to be in a third state by pinching the tube with a second closing force, which second closing force is adapted to stop the flow in the tube at a second fluid pressure in the tube which is higher than the first fluid pressure in the tube.

13. The bioprocess flow system according to claim 10, wherein said at least one valve is a membrane valve and said control system is configured for controlling said at least one membrane valve to be in the second state by moving a membrane of the membrane valve towards a valve seat of the membrane valve with a first closing force, which first closing force is adapted to stop the flow in the tube at a first fluid pressure in the tube; and wherein said control system is configured for controlling said at least one membrane valve to be in a third state by moving the membrane of the membrane valve towards the valve seat of the membrane valve with a second closing force, which second closing force is adapted to stop the flow in the tube at a second fluid pressure in the tube which is higher than the first fluid pressure in the tube.

14. The bioprocess flow system according to claim 10, wherein said control system is configured for controlling the state of the at least one valve to be either in the second or the third state for closing the valve in dependence of which type of tubes that are used in the system and/or in dependence of which application the system is used for.

15. The bioprocess flow system according to claim 10, wherein said at least one valve comprises means for controlling the state of the valve by pneumatic air or hydraulic fluid and wherein said control system is configured for controlling said pneumatic air or hydraulic fluid.

16. The bioprocess flow system according to claim 10, wherein said bioprocess flow system is a chromatography system, a filtration system or a bioreactor system.

17. The bioprocess flow system according to claim 10, wherein a first closing force is provided from the at least one valve in the second state and a second closing force is provided from the at least one valve in the third state, wherein said first closing force is set to prevent fluid flow at a fluid pressure being less than 50% of the fluid pressure the second closing force is set to prevent.

18. The bioprocess flow system according to claim 10, wherein a first closing force is provided from the at least one valve in the second state and a second closing force is provided from the at least one valve in the third state, wherein said second closing force is set to prevent fluid flow at a pressure of up to 20 bar.

19. A valve, wherein said valve is configured for being provided in three different states, whereof
a first state is an open state where a tube provided with said valve is kept open for allowing flow through the tube;
a second and a third state are closed states but with different closing forces, whereby a tube provided with said valve is closed for flow in both these closed states but with a higher closing force in the third state than in the second state; and
wherein the valve comprises a control system configured for controlling the valve to be provided in the different states, such that the control system is configured for controlling the valve to be in the third state when a tube provided with the valve should be closed for not allowing flow through the tube when a system or part of the system where the valve is provided is in operation, and for controlling the valve to be in the second state when the valve should be closed when the system or a part of the system where the valve is provided is not in operation, when waiting for other parts or operations in the system, separation process or workflow to be completed or if the system is paused.

20. The valve according to claim 19, wherein said valve is provided in said second and third states by urging a pinching portion of the tube into sealing contact.

21. The valve according to claim 19, wherein said valve is a pinch valve and
said second state is a closed state preventing flow through the tube provided with said valve, wherein flow is prevented by pinching the tube with a first closing force, which first closing force is adapted to stop the flow in the tube at a first fluid pressure in the tube; and said third state is a closed state preventing flow through the tube provided with said valve, wherein flow is prevented by pinching the tube with a second closing force, which second closing force is adapted to stop the flow in the tube at a second fluid pressure in the tube which is higher than the first fluid pressure in the tube.

22. The valve according to claim 19, wherein said valve is a membrane valve and said second state is a closed state preventing flow through the tube provided with said membrane valve, wherein flow is prevented by moving a membrane of the membrane valve towards a valve seat of the membrane valve with a first closing force, which first closing force is adapted to stop the flow in the tube at a first fluid pressure in the tube; and said third state is a closed state preventing flow through the tube provided with said membrane valve, wherein flow is prevented by moving the membrane of the membrane valve towards the valve seat of the membrane valve with a second closing force, which second closing force is adapted to stop the flow in the tube at a second fluid pressure in the tube which is higher than the first fluid pressure in the tube.

23. The valve according to claim 22, wherein said membrane valve comprises a valve tube for connection of a hydraulic/pneumatic chamber of said membrane valve to a hydraulic/pneumatic control system, wherein said valve tube comprises a sterile filter.

24. The valve according to claim 19, wherein said valve comprises means for controlling the valve by pneumatic air or hydraulic fluid.

* * * * *